US006292664B1

United States Patent
Östrup et al.

(10) Patent No.: US 6,292,664 B1
(45) Date of Patent: *Sep. 18, 2001

(54) CHANNEL QUALITY IN WIRELESS COMMUNICATIONS

(75) Inventors: Peter Östrup; Mikael Andersson; Anders Kjell Westroos, all of Linköping (SE)

(73) Assignee: Telefon Aktiebolaget LM Ericsson (publ) (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,897

(22) Filed: Feb. 6, 1998

(51) Int. Cl.[7] ........................................ H04Q 7/20
(52) U.S. Cl. ................ 455/453; 455/452; 455/63; 455/67.1; 455/67.3; 455/71; 455/450
(58) Field of Search ................. 455/450, 451, 455/452, 453, 512, 524, 62, 63, 67.1, 513, 226.1, 67.4, 509; 370/230, 465, 468, 329, 336, 337, 345, 347, 477

(56) References Cited

U.S. PATENT DOCUMENTS

| 5,203,008 | * | 4/1993 | Yasuda et al. ............... 455/62 X |
| 5,327,576 | | 7/1994 | Uddenfeldt et al. ............ 455/33.2 |
| 5,355,514 | * | 10/1994 | Borg ........................... 455/450 X |
| 5,471,645 | | 11/1995 | Felix ........................... 455/34.2 |
| 5,483,666 | * | 1/1996 | Yamada et al. .............. 455/62 X |
| 5,561,847 | * | 10/1996 | Kataoka ...................... 455/450 X |
| 5,649,293 | * | 7/1997 | Reed ........................... 455/453 |
| 5,729,531 | * | 3/1998 | Raith et al. .................. 455/453 X |
| 5,857,147 | * | 1/1999 | Gardner et al. .............. 455/67.1 |

FOREIGN PATENT DOCUMENTS

| 100755 | 10/1998 | (EP) . |
| WO 95 07578 | 3/1995 | (WO) . |
| WO 95 12257 | 5/1995 | (WO) . |
| WO 95/12257 | * 5/1995 | (WO) ............................. 7/20 |

* cited by examiner

Primary Examiner—Daniel Hunter
Assistant Examiner—Yemane Woldetatios
(74) Attorney, Agent, or Firm—Jenken & Gilchrist, P.C.

(57) ABSTRACT

A system and method in a wireless communications environment maximizes voice quality in low capacity situations. A Mobile services Switching Centre (MSC) that is associated with a base station of a cell is capable of assigning speech calls of mobile terminals to either a full-rate (FR) or a half-rate (HR) channel. The FR channels provide better transmitted voice quality but consume twice the bandwidth (two time slots versus only one for HR channels). When occupied cell capacity is low, an MSC assigns connections to FR channels. After occupied cell capacity reaches a predetermined threshold value, the MSC assigns connections to HR channels whenever possible. Also, handover procedures can reclaim available capacity by switching a connection from a FR to a HR channel. The superior voice quality of the FR channels are therefore provided to mobile terminal users more often.

15 Claims, 4 Drawing Sheets

CHANNEL QUALITY IN WIRELESS COMMUNICATIONS

BACKGROUND OF THE INVENTION

1. Technical Field of the Invention

The present invention relates in general to the wireless communication systems field, and in particular, to a method and system for improving channel quality in wireless communication systems.

2. Description of Related Art

Benefits of mobile wireless communications are safety, convenience, and efficiency. To maximize the enjoyment of these benefits, the quality of transmitted voice signals should be optimized. Voice quality in today's digital communication systems depends primarily on the coding process employed to digitize speech. One parameter affecting voice quality is the number of bits per second transmitted by a given speech coding technique (e.g., using vocoders, waveform coders, hybrid coders, etc.). Generally, the higher the bit rate, the better the voice quality.

Unfortunately, as the bit rate is increased, the transmission bandwidth demanded by the speech coding technique is also increased. In a cellular wireless communications system, the transmission bandwidth between the mobile terminals and a base station is finite. This finite transmission bandwidth is best utilized in existing cellular systems by assigning channels that can accommodate the speech coding technique with the lowest-possible bit rate.

A conventional traffic channel assignment method is for a base station to receive a request from a mobile terminal for a traffic channel. The associated cellular system then determines the lowest-possible traffic bit rate. The mobile terminal's call is then assigned to a channel that uses the lowest-possible traffic bit rate.

The problem with the existing cellular systems is that the lowest-possible traffic rate channel often corresponds to the use of a sub-optimum speech coding technique. In other words, the associated cellular system requires the use of a speech coding technique with fewer bits per second, in order to minimize the amount of the total available bandwidth occupied by a single call from a mobile terminal. Unfortunately, reduced speech quality accompanies the use of a lower-rate speech coding technique. Furthermore, existing cellular systems typically select a lower-rate speech coding technique for a call even when significant bandwidth capacity in a given cell is available. For example, a half-rate traffic channel is used to gain capacity in the network, and today a half-rate channel is always assigned when the mobile terminal is capable of half-rate, the call is between the mobile terminal and the Public Switched Telephone Network (PSTN), and the call is a speech call.

In summary, conventional traffic channel assignment methods assign the lowest-possible traffic rate channel to a mobile terminal at the expense of transmitted voice quality.

SUMMARY OF THE INVENTION

The present invention provides a method and system for assigning premium traffic channels to mobile terminals that request calls. In accordance with the present invention, each cell in a communications system is assigned a predetermined High Traffic Threshold (HTTH) value. The HTTH value can be defined, for example, as an absolute number of channels in use, or a ratio of the channels in use to the total channels provided in the cell. According to a first embodiment, call requests from mobile terminals are assigned premium (e.g., higher bit rate) traffic channels until the occupied capacity of the cell reaches the HTTH value. Thereafter, mobile terminals are assigned traffic channels that provide a lower speech quality.

In a second embodiment, a first speech coding technique is provided that uses a predetermined number of bits for digitizing a voice signal. A second speech coding technique uses half the predetermined number of bits; consequently, voice quality using the first technique is superior. When a base station receives a request from a first mobile terminal for a traffic channel while occupied capacity is below the HTTH value, a traffic channel using the first speech coding technique is assigned by, for example, an associated Mobile services Switching Centre (MSC). Alternatively, when a base station receives a request from a second mobile terminal for a traffic channel after occupied capacity has exceeded the HTTH value, a traffic channel that corresponds to the second speech coding technique is assigned as the call situation permits.

An important technical advantage of the present invention is that it enables intelligent traffic channel selection.

Another important technical advantage of the present invention is that it provides efficient use of available wireless communication bandwidth.

Yet another important technical advantage of the present invention is the ability to adjust the selected speech coding technique, and thus the transmitted voice quality, based on the current occupied cell capacity.

Yet another important technical advantage of the present invention is the ability to improve voice quality for users when the cell is operating at less than full-capacity.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–4 of the drawings, like numerals being used for like and corresponding parts of the various drawings.

Figure 1:
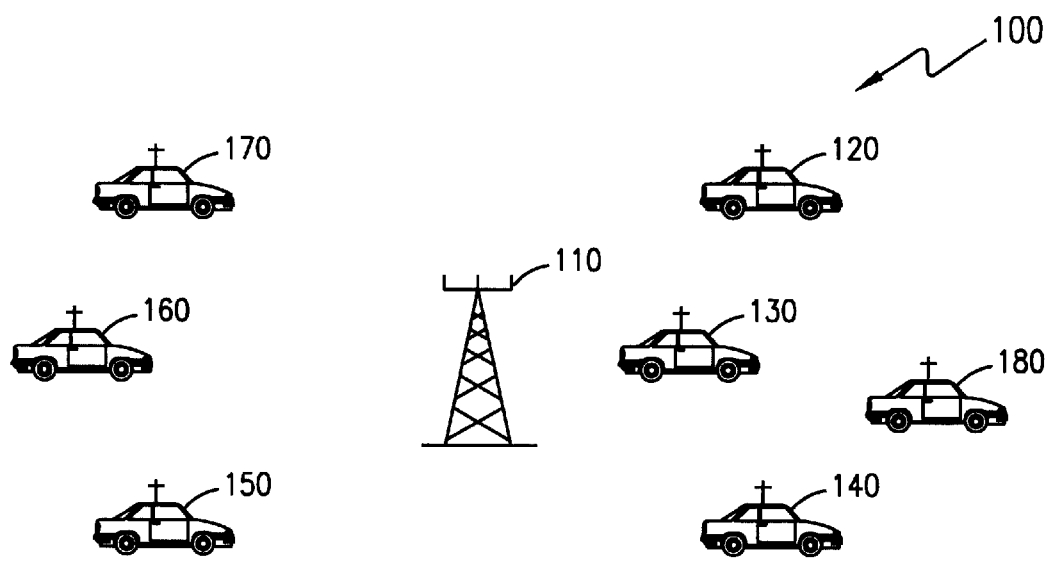
FIG. 1 illustrates an exemplary cellular communications cell that can be used to describe the present invention.

FIG. 1 illustrates an exemplary cellular communications cell that can be used to describe the present invention. A cell 100 is illustrated. The cell 100 is part of cellular communications system that can include a Mobile services Switching Centre (MSC) (not specifically shown). A base station (BS) 110, which is associated with the MSC, is shown along with mobile terminals (hereinafter mobile stations, or MSs) 120, 130, 140, 150, 160, 170, and 180. Although the MSs 120–180 are represented by cellular-phone-equipped vehicles, the invention is not intended to be so limited. The MSs 120–180 can also be hand-held cellular phones or any general wireless communication device. For example, one or more of the MSs 120–180 can be a wireless communications device for a portable computer.

The present invention will be described in relation to the Personal Digital Cellular System (PDC) presently fielded in Japan. In the PDC, procedures for establishing communications and engaging a call between mobile terminals and base stations are defined. For instance, when a mobile terminal wishes to place or receive a call, the mobile terminal is required to secure a channel from a proximate base station.

According to a preferred embodiment of the present invention, the channel selection and assignment efficiency of an MSC that is associated with the proximate base station is improved over existing systems. The improvement can be found in improved voice quality at lower cellular capacity levels.

For clarity, the following two definitions are provided:

Channel Rate: "Channel rate" indicates the channel rate presently in use for a traffic channel. Possible values for the channel rate in this embodiment are Full-Rate (FR) and Half-Rate (HR).

High Traffic Threshold (HTTH): The HTTH value is defined as the limiting value that, when exceeded, specifies a "high" traffic level. The HTTH value is preferably defined in units of "number of busy traffic channels/cell".

Examples of possible connection types between a BS and a MS are listed in Table 1 below. It should be noted that this list is not exhaustive, and the present invention can be used in conjunction with other connection types. The four exemplary connection types listed are (1) Pulse Code Modulation (PCM), (2) Vector-Sum Excited Speech (VSELP) Coding, (3) Pitch Synchronous Innovation—Code-Excited Linear-Predictive (PSI-CELP) Coding, and (4) Non-Speech (e.g., data).

TABLE 1.

EXAMPLES OF POSSIBLE CONNECTION TYPES

| | | |
|---|---|---|
| (1) | Speech my-law PCM at 64 kbit/s. | The transcoder is active and is sending a 64 kbit/s PCM-coded speech signal to the network. |
| (2) | Speech VSELP coder/decoder (codec) at 11.2 kbit/s. | The transcoder is not decoding the signal from the MS, but it is sending a VSELP coded signal to the network. This mode is valid for Full-Rate channels. |
| (3) | Speech PSI-CELP codec at 5.6 kbit/s. | The transcoder is not decoding the signal from the MS, but it is sending a PSI-CELP coded signal to the network. This mode is valid for Half-Rate channels. |
| (4) | Non-speech. | The transcoder is working in FAX/MODEM mode. This mode is valid for Full-Rate channels. |

In a preferred embodiment, the invention is primarily directed toward selecting a channel employing the VSELP codec (2) or the PSI-CELP codec (3). A higher bit rate enables improved voice quality (e.g., voices sound less artificial and are more-easily recognizable) because the vocal sounds can be digitally modeled more accurately. Hence, a call using VSELP coding (2) sounds superior to a call using PSI-CELP coding (3).

Figure 2:
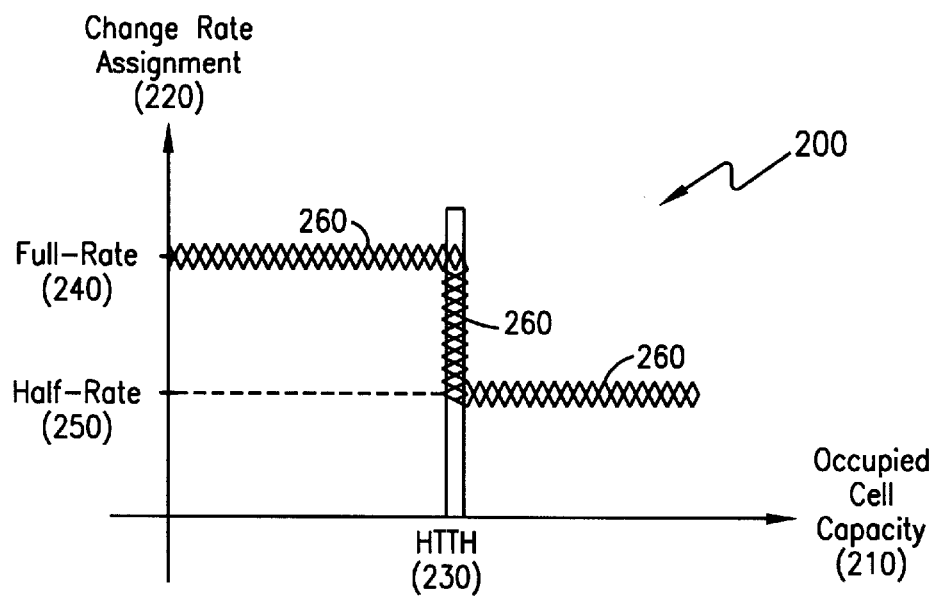
FIG. 2 is a graphical diagram that illustrates an exemplary channel rate assignment function according to a preferred embodiment of the present invention.

FIG. 2 is a graphical diagram that illustrates an exemplary channel rate assignment function according to a preferred embodiment of the present invention. The Graph 200 illustrates a switch from one channel rate to another by showing occupied cell capacity 210 versus channel rate assignment 220. A preferred embodiment of the present invention as represented by the Graph 200 can be applied, for example, to the cell 100 (of FIG. 1). In such an example, the MSC that is associated with the BS 110 preferably determines which traffic channels should be assigned to the requesting MSs 120–180. The BS 110 then communicates with the MSs 120–180 using the appropriate assigned traffic channel. As occupied cell capacity 210 increases (in the positive direction), the HTTH value 230 is eventually exceeded. As shown by a channel assignment function 260 (as represented by the cross-hatched line), a Full-Rate 240 channel (corresponding to item (2) in Table 1, for example) is assigned to the requesting MSs 120–180 until the occupied cell capacity 210 equals the HTTH value 230.

Thereafter, a Half-Rate 250 channel (corresponding to item (3) in Table 1, for example) is assigned to the requesting MSs 120–180. The channel assignment function 260 is shown as decreasing from a Full-Rate 240 channel assignment level to a Half-Rate 250 channel assignment level at the HTTH value 230. It should be understood, however, that the first call assigned to a Half-Rate 250 channel may be the call that creates an HTTH 230 situation, or it may be the call immediately following the creation of an HTTH 230 situation, etc. In summary, each call initiated by a MS 120–180 is assigned a Full-Rate 240 channel by the MSC that is associated with the BS 110 to maximize voice quality until an occupied cell capacity 210 level equal to the HTTH value 230 is reached. Each subsequent request by a MS 120–180 is assigned a Half-Rate 250 channel to conserve available bandwidth.

Figure 3A:
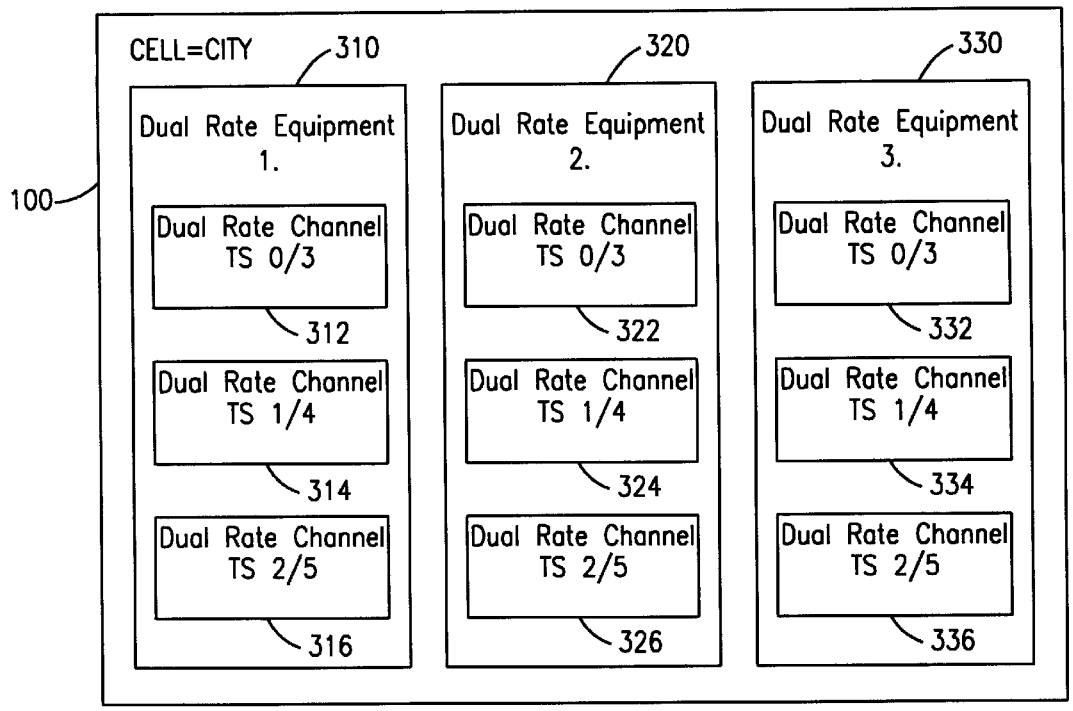
FIG. 3A illustrates exemplary dual rate channels and associated equipment that can be utilized in the cell of FIG. 1 according to a preferred embodiment of the present invention.

FIG. 3A illustrates exemplary dual rate channels and associated equipment that can be utilized in the cell of FIG. 1 according to a preferred embodiment of the present invention. The cell 100 is illustrated as including logical blocks representing communications equipment that are preferably compatible with the PDC standard. The cell 100 is exemplary and can cover an entire city. In this example, the BS 110 includes dual rate equipment 310, 320, and 330. The number of dual rate equipment (three) in the cell 100 is entirely exemplary and the invention is not limited to any particular number.

For clarity, an additional five definitions are provided:

Dual Rate Equipment: A dual rate equipment denotes BS equipment that provides resources capable of carrying FR and HR connections. One dual rate equipment provides three dual rate channel pairs.

Dual Rate Channel Pair: A dual rate channel pair denotes the channels on dual rate equipment that together provide a resource capable of carrying one FR connection or two HR connections. A dual rate channel pair consists of two dual rate traffic channels.

Dual Rate Traffic Channel: A dual rate traffic channel denotes a traffic channel included in a dual rate channel pair. Each dual rate traffic channel in a dual rate channel pair is capable of carrying a HR connection. Two dual rate traffic channels in a dual rate channel pair are together capable of carrying a FR connection.

Full Rate Traffic Channel: A full rate traffic channel represents a traffic channel carrying a FR connection. In the air interface, a full rate traffic channel corresponds to one FR time slot (TS), i.e., TS0/TS3, TS1/TS4, and TS2/TS5 as indicated in FIG. 3A. One FR time slot corresponds to two HR time slots.

Half Rate Traffic Channel: A half rate traffic channel represents a traffic channel carrying a HR connection. In the air interface, a half rate traffic channel corresponds to one HR time slot, i.e., TS0, TS1, TS2, TS3, TS4, and TS5 as indicated in FIG. 3A.

Continuing with FIG. 3A, the dual rate equipment 310 includes dual rate channels 312, 314, and 316 (i.e., three dual rate channel pairs). The dual rate equipment 320 includes dual rate channels 322, 324, and 326. The dual rate equipment 330 includes dual rate channels 332, 334, and 336. Each dual rate channel can sustain either two HR connections or one FR connection as explained above. Hence, with three dual rate equipment, the cell 100 can support 6 HR connections, 9 FR connections, 8 HR along with 5 FR connections, or any other equivalent combination.

Figure 3B:
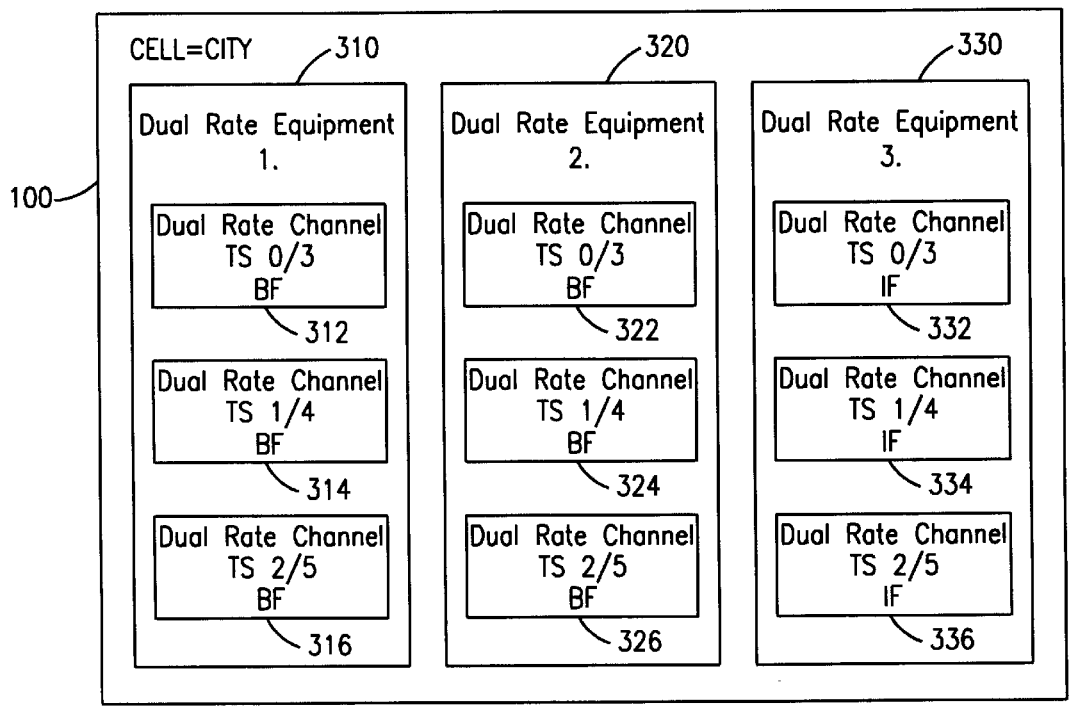
FIG. 3B illustrates an exemplary first channel rate occupancy status of the cell shown in FIG. 1, according to a preferred embodiment of the present invention.

FIG. 3B illustrates an exemplary first channel rate occupancy status of the cell shown in FIG. 1, according to a preferred embodiment of the present invention. The cell 100 and the dual rate equipment 310, 320, and 330 are illustrated with busy and idle indications for each dual rate channel. The indications are described in Table 2.

TABLE 2.

BUSY/IDLE INDICATIONS KEY FOR FIGS. 3B–3D

| | |
|---|---|
| BF | Busy -- FR Connection |
| IF | Idle -- FR Connection |
| BH | Busy -- HR Connection |
| IH | Idle -- HR Connection |

In this example, the HTTH value 230 for the cell 100 is set to six (6) busy dual traffic channels. Hence, as explained above with respect to FIGS. 1 and 2, after six dual rate channels are busy, subsequent channel assignments will be made to HR channels. Referring again to Table 1, VSELP-coded (2) speech is preferably transmitted on a FR traffic channel (e.g., TS1/TS4 ), while PSI-CELP-coded (1) speech is preferably transmitted on a HR traffic channel (e.g., TS3).

In FIG. 3B, six dual rate channels 312, 314, 316, 322, 324, and 326 have been assigned as FR traffic channels to the MSs 120–170 by the MSC that is associated with the BS 110. The busy and FR status of each is denoted by "BF". Three dual rate channels 332, 334, and 336 are unused, and the status of each is denoted by "IF". At this point, the capacity of the cell 100 is equal to the HTTH value 230; consequently, the next MS that requests a channel will be assigned a HR traffic channel if possible, as explained further below.

Figure 3C:
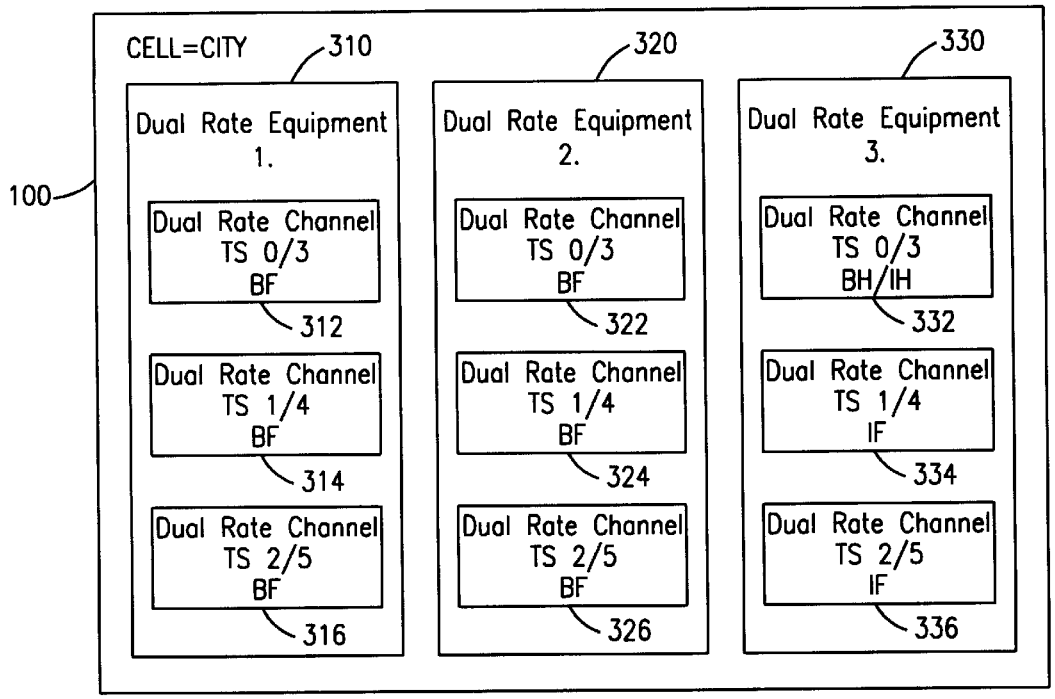
FIG. 3C illustrates an exemplary second channel rate occupancy status of the cell shown in FIG. 1, according to a preferred embodiment of the present invention.

FIG. 3C illustrates an exemplary second channel rate occupancy status of the cell shown in FIG. 1, according to a preferred embodiment of the present invention. A new state for cell 100 is illustrated. The dual rate channels 312, 314, 316, 322, 324, and 326 are still busy with a FR traffic connection, and the dual rate channels 334 and 336 are still idle at FR (i.e., neither TS1 nor TS4 and neither TS2 nor TS5 are occupied). However, MS 180 has requested a traffic channel. Because the capacity of the cell 100 is at a value HTTH=6, the MSC that is associated with the BS 110 assigns a HR traffic connection (e.g., a dual rate traffic channel) from the dual rate channel 332 (assuming the call can accept a HR connection as explained further below with respect to FIG. 4). The other dual rate traffic channel is still idle. This status is indicated by "BH/IH". In summary, MS 180 has been assigned TS0 of dual rate equipment 330, and a MS (e.g., MS 170 ) has been assigned TS2 and TS5 of dual rate equipment 320.

Advantageously, according to the present invention, the first six calls from MSs 120–170 receive FR traffic channels and the accompanying superior voice quality. After cell capacity has reached the HTTH value, the MSC that is associated with the BS 110 begins assigning HR traffic channels to conserve the remaining available traffic channels.

Figure 3D:
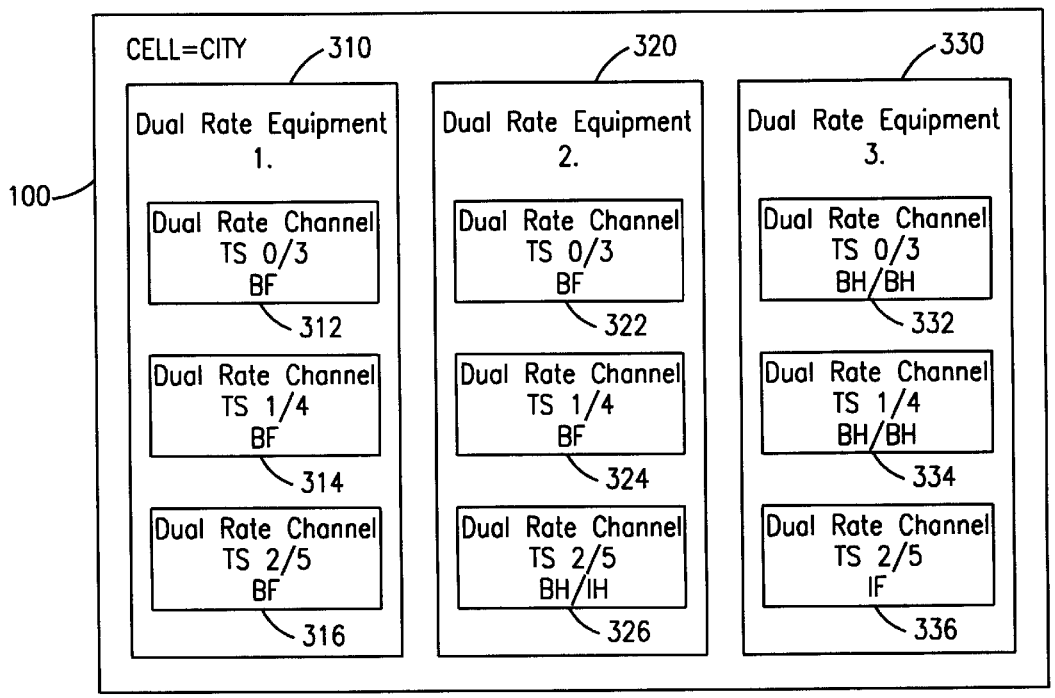
FIG. 3D illustrates an exemplary third channel rate occupancy status of the cell shown in FIG. 1, according to a preferred embodiment of the present invention.

Furthermore, the present invention also encompasses reclaiming previously-assigned channel bandwidth as illustrated in FIG. 3D. FIG. 3D illustrates an exemplary third channel rate occupancy status of the cell shown in FIG. 1, according to a preferred embodiment of the present invention. In FIG. 3D, the states of the dual rate channels 312, 314, 316, 322, and 324 are indicated as "BF". The states of the dual rate channels 332 and 334 are indicated as "BH/BH", and the state of the dual rate channel 336 is indicated as "IF". The indication for the state of the dual rate channel 326, however, has changed from "BF" to "BH/IH". The MS 170 that was occupying TS2 and TS5 has been switched (e.g., via a standard handover procedure) to occupying TS2 only. Therefore, in this example, TS5 is now idle. This handover procedure from a FR to a HR channel can be invoked, for example, any time after the cell 100 has reached the predetermined HTTH capacity level. Other connections that are capable of being maintained at HR and are currently assigned at FR may likewise be "handed over" from a dual rate channel pair to one dual rate traffic channel (e.g., that may or may not be part of the original dual rate channel pair).

Figure 4:
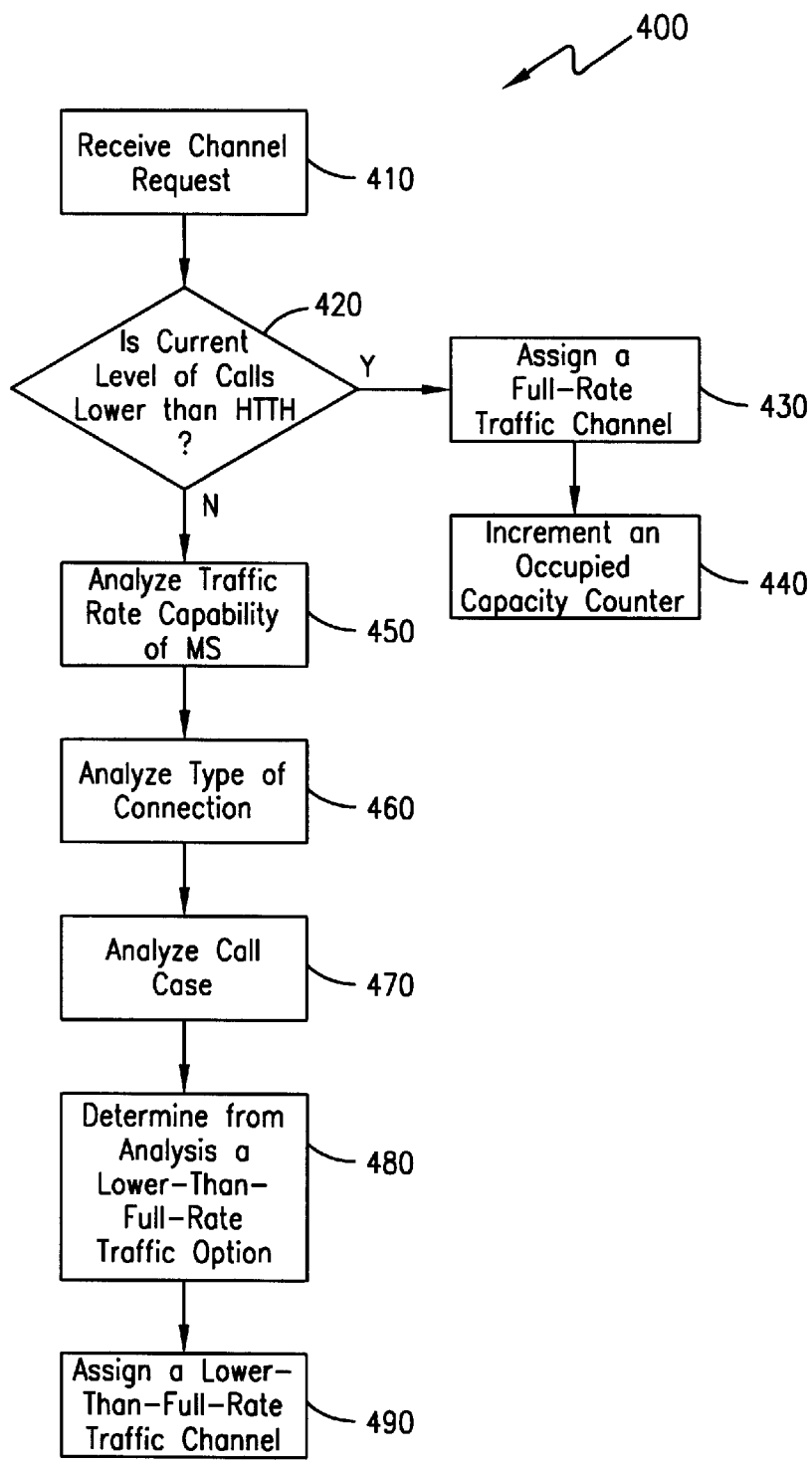
FIG. 4 illustrates an exemplary traffic channel assignment method according to a preferred embodiment of the present invention.

FIG. 4 illustrates an exemplary traffic channel assignment method according to a preferred embodiment of the present invention. A flowchart 400 illustrates a method that the MSC that is associated with the BS 110 undergoes when assigning traffic channels to requesting MSs 120–180. In this example, at step 410, BS 110 receives a request from MS 120 for a traffic channel. At step 420, the MSC that is associated with the BS 110 determines whether the current capacity is lower than the HTTH value, which is equal to six in this example. Because the request from MS 120 is the first request for a connection, the answer is "yes", and the method proceeds to step 430.

At step 430, the associated MSC assigns a FR traffic channel (e.g., dual rate channel 412) to the call of MS 120.

It should be noted that the invention also includes assigning any traffic channel that is higher than the lowest-possible bit rate for the call. At step 440, an Occupied Capacity Counter is incremented (by one in this example of adding a FR channel), which count represents the current level of calls. It should be noted that the current level of calls need not be incremented in whole units and can be expressed in ratio terms instead of a number. When the Occupied Capacity Counter's count is a number, for example, it can be modified as follows: by +1 if a new FR channel is assigned; by −1 if a previously-busy FR channel becomes available; by +½ if a new HR channel is assigned; and by −½ if a previously-busy HR channel becomes available.

On subsequent iterations of the present method, MSs 130–170 also request connections. As such, the MSC that is associated with the BS 110 can proceed through the flowchart 400 five more times and assign dual rate channels 314, 316, 322, 324, and 326 to MSs 130, 140, 150, 160, and 170, respectively. The Occupied Capacity Counter's count is incremented to six after these last five iterations. Consequently, the Occupied Capacity Counter's count equals the HTTH value 230.

When the BS 110 receives from the MS 180 a request for a channel, at step 420, the associated MSC determines that the current level of calls (e.g., the Occupied Capacity Counter's count) is not lower than the HTTH value 230. This negative result can cause the associated MSC to attempt to use a lower-than-FR traffic channel (e.g., a HR traffic channel) for the connection with the MS 180. Before the HR traffic channel is assigned, the MSC that is associated with the BS 110 preferably verifies whether or not a HR traffic channel may be assigned, as explained below.

At step 450, the traffic rate capability of the MS 180 is analyzed. Older MSs may not be capable of using the more-recently-developed PSI-CELP codec (listed at (3) in Table 1).

If the MS 180 can only use the higher-bit-rate codec, then the MSC that is associated with the BS 110 assigns a FR traffic channel (e.g., dual rate channel 332). The BS 110 may now begin to execute handover procedures to liberate a portion of the bandwidth in the cell 100. If, on the other hand, the MS 180 can use a lower-bit-rate codec, then the associated MSC proceeds to step 460.

At step 460, the MSC that is associated with the BS 110 analyzes the type of connection requested. A facsimile connection, for example, is ineligible for a HR traffic channel because fax communication is designed for 14.4 kbit/s transmissions. A speech connection, on the other hand, may be assigned a HR traffic channel (e.g., using a PSI-CELP codec). Therefore, assuming the MS 180 is attempting to initiate a voice connection, the associated MSC proceeds to step 470.

At step 470, the MSC that is associated with the BS 110 analyzes the call case. If the call is to be established between the MS 180 and the PSTN, for example, then the HR traffic channel can be used. The associated MSC then proceeds to step 480.

From the analyses conducted in steps 450, 460, and 470, the MSC that is associated with the BS 110 determines an appropriate traffic channel option that is lower-than-FR (e.g., the lowest-possible rate). The traffic channel may be between the lowest and highest bit rates available, if more than two rates are possible in a given system. For example, a quarter-rate (QR) channel and corresponding codec can be implemented for speech communications. Even with the three rates (full, half, and quarter), occupied capacity may only require the use of the HR channel instead of the QR channel. If the occupied capacity is a significant portion of the total available capacity, then the lowest-rate option (QR in this example) will be selected. Continuing with the current FR and HR example, at step 480, the MSC that is associated with the BS 110 will select the HR traffic option and assign a HR traffic channel (e.g., at step 490, the dual rate traffic channel TS0 of the dual rate channel 332) to the MS 180.

Other embodiments of the present invention are possible, some of which were alluded to above. For example, a designer in the art can extrapolate beyond three dual rate equipment. Also, the concepts of an HTTH and an Occupied Capacity Counter are flexible; each may be a number, a ratio, etc. Furthermore, the logical determination performed in step 420 (of FIG. 4) is exemplary only. Instead of a "less than determination" step, a "less than or equal determination" step (with possibly, although not necessarily, a modification of the HTTH value) can be performed. Moreover, the logical contingency can be substituted with, for example, the following: "Is the Current Level of Calls Greater than the HTTH value?". (With this query, the flow of the positive and negative branches are swapped.)

Additionally, the present invention is not limited to the two-rate system of the exemplary embodiment. It is equally applicable to multiple rate systems, such as the full, half, and quarter rate system mentioned above. In fact, in a multiple rate embodiment, multiple thresholds may be used. In the three rate system, for example, two thresholds can be used in which reaching the first threshold can cause a switch over to the HR channels to occur, and reaching the second threshold causes a switch over to the QR channels.

The method of the present invention can be implemented in software, hardware, firmware, etc. Whether the invention is implemented in software, hardware, or firmware, the instruction code can be stored in any type of computer-accessible memory (e.g., permanent or modifiable, volatile or nonvolatile, solid-state or not, fixed or removable media, etc.). Also, for example, the memory can be programmable array logic (PAL), random access memory (RAM), programmable read only memory (PROM), read only memory (ROM), electrically erasable programmable read only memory (EEPROM), magnetic, optical, digital versatile disk (DVD), etc. It should be noted that the present invention has a myriad of practical applications. For example, it improves the speech quality of calls at lower traffic levels.

Though the exemplary embodiment of the present invention has been presented in terms of the PDC standard, it is equally applicable to other implementations and/or standards that are presently in use or as-of-yet undeveloped. The present invention may be advantageously used, for instance, in any system that has two or more channel options for a given connection or call, especially when quality varies between or among the options. Modifications necessary for implementation with these other standards will become apparent to those skilled in the art once they have read and understood the teachings of the present invention.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving transmission in a wireless communications system, comprising the steps of:
   receiving a request from a mobile terminal for a communications channel;
   ascertaining an occupied capacity of a cell;
   comparing said occupied capacity to a predetermined threshold value;
   assigning a traffic channel to said mobile terminal based on the comparing step and responsive to the receiving step, said traffic channel consuming less than a maximum channel bandwidth if said occupied capacity is greater than said predetermined threshold;
   determining whether said mobile terminal can accommodate a reduced-rate traffic channel; and
   wherein the step of assigning is further based on the determining step.

2. The method of claim 1, wherein the step of assigning further comprises the step of:
   assigning said traffic channel in which said traffic channel corresponds to a half-rate channel in which speech is digitized with a Pitch Synchronous Innovation—Code-Excited Linear-Predictive (PSI-CELP) codec.

3. A method for improving transmission in a wireless communications system, comprising the steps of:
   receiving a request from a mobile terminal for a communications channel;
   ascertaining an occupied capacity of a cell;
   comparing said occupied capacity to a predetermined threshold value;
   assigning a traffic channel to said mobile terminal based on the comparing step and responsive to the receiving step, said traffic channel consuming more than a minimum channel bandwidth if said occupied capacity is less than said predetermined threshold;
   determining whether said mobile terminal can accommodate a reduced-rate traffic channel; and
   wherein the step of assigning is further based on the determining step.

4. The method of claim 3, wherein the step of assigning further comprises the step of:
   assigning said traffic channel in which said traffic channel corresponds to a full-rate channel in which speech is digitized with a Vector-Sum Excited Speech (VSELP) codec.

5. The method of claim 1, further comprising the step of:
   determining whether said communications channel is for a speech transmission; and
   wherein the step of assigning is further based on the determining step.

6. The method of claim 1, further comprising the step of:
   determining whether said request is for a call connecting with a public-switched telephone network (PSTN); and
   wherein the step of assigning is further based on the determining step.

7. The method of claim 3, further comprising the step of:
   increasing a value associated with said occupied capacity when said traffic channel is assigned.

8. The method of claim 3, further comprising the step of:
   decreasing a value associated with said occupied capacity when said traffic channel is relinquished by said mobile terminal.

9. A method for improving transmission in a wireless communications system, comprising the steps of:
   receiving a request from a mobile terminal for a communications channel;
   ascertaining an occupied capacity of a cell;
   comparing said occupied capacity to a predetermined threshold value;
   assigning to said mobile terminal a traffic channel based on the comparing step; and
   reclaiming a portion of previously-assigned bandwidth by using a handover procedure with said mobile terminal to switch said mobile terminal from a higher-bandwidth communications channel to a lower-bandwidth communications channel.

10. A method for improving voice quality in a wireless communications system, comprising the steps of:
    receiving a request from a mobile terminal for a communications channel;
    determining whether an occupied capacity counter value is lower than a high traffic threshold value;
    if so,
       assigning a full-rate traffic channel to said mobile terminal; and
       incrementing said occupied capacity counter; if not,
       determining a traffic rate capability of said mobile terminal;
       determining a connection type for said communications channel;
       determining a call case for said request;
       determining whether a lower-than-full-rate traffic option is permissible; and
       assigning an appropriate traffic rate channel.

11. The method of claim 10, wherein the step of determining whether a lower-than-full-rate traffic option is permissible further comprises the step of determining that a lower-than-full-rate traffic option is permissible when said traffic rate capability includes half-rate, when said connection type is speech, and when said call case is for connecting a mobile terminal and a public-switched telephone network (PSTN).

12. The method of claim 11, wherein the step of assigning an appropriate traffic rate channel further comprises the step of assigning a half-rate channel.

13. A method for improving transmission in a wireless communications system, comprising the steps of:
    receiving a request from a mobile terminal for a communications channel;
    ascertaining an occupied capacity of a selected area of the wireless communications system;
    comparing said occupied capacity to a predetermined threshold value;
    assigning to said mobile terminal, responsive to said request from said mobile terminal for said communications channel, a first traffic channel that consumes less than a maximum channel bandwidth if said occupied capacity is greater than or equal to said predetermined threshold;
    assigning to said mobile terminal, responsive to said request from said mobile terminal for said communications channel, a second traffic channel that consumes more than a minimum channel bandwidth if said occupied capacity is less than or equal to said predetermined threshold, and determining that said mobile terminal can accommodate said first and second traffic channels as applicable.

14. A method for improving transmission in a wireless communications system that is operating in a time division multiple access (TDMA) manner, comprising the steps of:

receiving a request from a mobile terminal for a communications channel;

ascertaining an occupied capacity of a selected area of the wireless communications system;

comparing said occupied capacity to a predetermined threshold value;

assigning to said mobile terminal a first traffic channel that consumes less than a maximum channel bandwidth if said occupied capacity is greater than said predetermined threshold; assigning to said mobile terminal a second traffic channel that consumes more than a minimum channel bandwidth if said occupied capacity is less than said predetermined threshold, and determining whether said mobile terminal can accommodate its assigned traffic channel, wherein the steps of assigning first and second traffic channels are based on the determining step.

15. A method for improving voice quality in a wireless communications system, comprising the steps of:

receiving a request from a mobile terminal for a communications channel;

determining whether an occupied capacity counter value is lower than a high traffic threshold value;

if so,
assigning a full-rate traffic channel to said mobile terminal; and
incrementing said occupied capacity counter; if not,
determining a traffic rate capability of said mobile terminal;
determining whether a lower-than-full-rate traffic option is permissible; and
assigning a lower-than-full-rate traffic channel if it is determined (i) that said mobile terminal is capable of said lower-than-full-rate traffic channel and (ii) that said lower-than-full-rate traffic option is permissible.

* * * * *